US012737255B2

(12) United States Patent
Pan et al.

(10) Patent No.: US 12,737,255 B2
(45) Date of Patent: Sep. 15, 2026

(54) METHOD FOR HANDLING MALFUNCTIONS, ELECTRONIC DEVICE, AND STORAGE MEDIUM

(71) Applicant: Fulian Precision Electronics (Tianjin) Co., LTD., Tianjin (CN)

(72) Inventors: Sheng-Chung Pan, New Taipei (TW); Hsiao-Wen Tsai, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 19 days.

(21) Appl. No.: 18/969,529

(22) Filed: Dec. 5, 2024

(65) Prior Publication Data

US 2026/0119307 A1 Apr. 30, 2026

(30) Foreign Application Priority Data

Oct. 31, 2024 (CN) ......................... 202411544630.5

(51) Int. Cl.
*G06F 11/00* (2006.01)
*G06F 11/07* (2006.01)
*G06F 11/34* (2006.01)

(52) U.S. Cl.
CPC ...... *G06F 11/0793* (2013.01); *G06F 11/0706* (2013.01); *G06F 11/3476* (2013.01)

(58) Field of Classification Search
CPC ............. G06F 11/0766; G06F 11/0769; G06F 11/0781; G06F 11/0793; G06F 11/2252; G06F 11/2257; G06F 11/3476
See application file for complete search history.

(56) References Cited

U.S. PATENT DOCUMENTS 12,056,003 B1 * 8/2024 Ramos ................ G06F 11/0793
2005/0172162 A1 * 8/2005 Takahashi ........... G06F 11/0793 714/4.4
2019/0163594 A1 * 5/2019 Hayden ............... G06F 11/3024
2019/0347149 A1 * 11/2019 Panigrahi .......... G06F 16/24578
2021/0124661 A1 * 4/2021 Rafey ................. G06F 11/3006
2022/0050765 A1 * 2/2022 Pan ......................... G06F 40/30
2022/0286351 A1 * 9/2022 Liao .................... G06F 11/0793
2022/0391278 A1 * 12/2022 Monga ................ G06F 11/0754
2023/0161662 A1 * 5/2023 Wollny ................. G06F 11/004 714/48
2023/0273849 A1 * 8/2023 Mahindru ........... G06F 11/0778 714/37

(Continued)

FOREIGN PATENT DOCUMENTS

CN 116881744 B 12/2023

*Primary Examiner* — Marc Duncan
(74) *Attorney, Agent, or Firm* — ScienBiziP, P.C.

(57) ABSTRACT

A method for handling malfunctions is provided. In the method, an electronic device collects device information of a device. The electronic device detects whether the device is abnormal, according to the device information. In response that the device is abnormal, the electronic device obtains log data from a database, the log data matches an event log of the device information. The electronic device determines a handling strategy of the device, according to the log data. The above method can quickly determine an abnormal situation of the device, and then handle malfunctions in time by performing an effective handling strategy, thereby ensuring stable operation and performance of the device.

17 Claims, 4 Drawing Sheets

(56) References Cited

U.S. PATENT DOCUMENTS

| | | | | |
|---|---|---|---|---|
| 2024/0176730 | A1* | 5/2024 | Dauber | G06F 11/0787 |
| 2024/0362106 | A1* | 10/2024 | Burch | G06F 11/2252 |
| 2025/0147832 | A1* | 5/2025 | Agrawal | G06F 11/0706 |

* cited by examiner

METHOD FOR HANDLING MALFUNCTIONS, ELECTRONIC DEVICE, AND STORAGE MEDIUM

FIELD

The present disclosure relates to a monitoring field, and more particularly to a method for handling malfunctions, an electronic device, and a storage medium.

BACKGROUND

With the rapid development of computer technology, performance of a device is constantly improved. In order to maintain a normal operation of the device, parameters that need to be monitored has increased. Therefore, monitoring data used to detect the performance of the device has also increased. However, with an expansion of the monitoring data, a monitoring system may not be able to quickly determine an abnormal situation of the device, resulting in an inability to resolve an abnormality of the device in time, thus affecting the device.

BRIEF DESCRIPTION OF THE DRAWINGS

In order to more clearly illustrate technical solutions in the embodiments of the present disclosure, drawings that need to be used in the descriptions of the embodiments or the prior art will be briefly introduced below. Obviously, the drawings in the following description are merely some examples of the present disclosure, those of ordinary skill in the art can also obtain other drawings based on the drawings without paying creative efforts.

DETAILED DESCRIPTION

The technical solutions in the embodiments of the present disclosure will be clearly and completely described below in conjunction with the drawings in the embodiments of the present disclosure, and it is obvious that a described embodiment is a part of the embodiments of the present disclosure, not all of the embodiments. Based on the embodiments in the present disclosure, all other embodiments obtained by a person of ordinary skill in the art without creative labor fall within the scope of protection of the present disclosure.

Hereinafter, terms "first" and "second" are used for descriptive purposes only, and are not to be construed as indicating or implying relative importance or implicitly specifying the number of technical features indicated. Thus, a feature defined with "first" or "second" may include one or more such features, either explicitly or implicitly. In the description of the embodiments of the present disclosure, words "exemplary" or "for example" are used to indicate an example, an illustration, or an illustration. Any embodiment or design solution described as "exemplary" or "for example" in the embodiments of the present disclosure should not be construed as being preferred or advantageous over other embodiments or design solutions. Rather, the words "exemplary" or "for example" is intended to present the relevant concepts in a specific manner.

Unless otherwise defined, all technical and scientific terms used herein have the same meaning as commonly understood by those skilled in the art in which this disclosure is filed. The terms used in the specification of this disclosure are used only for the purpose of describing specific embodiments and are not intended to limit this disclosure. It should be understood that in this disclosure, unless otherwise indicated, "/" means or. For example, A/B may denote either A or B. "And/or" in this disclosure is merely an associative relationship describing an associated object, indicating that three relationships may exist. For example, A and/or B can mean: A alone, both A and B, and B alone. "At least one" means one or more. "More than one" means two or more than two. For example, at least one of "a", "b" or "c" can mean: "a", "b", "c", "a" and "b", "a" and "c", b and "c", "a", "b" and "c" in seven cases.

Figure 1:
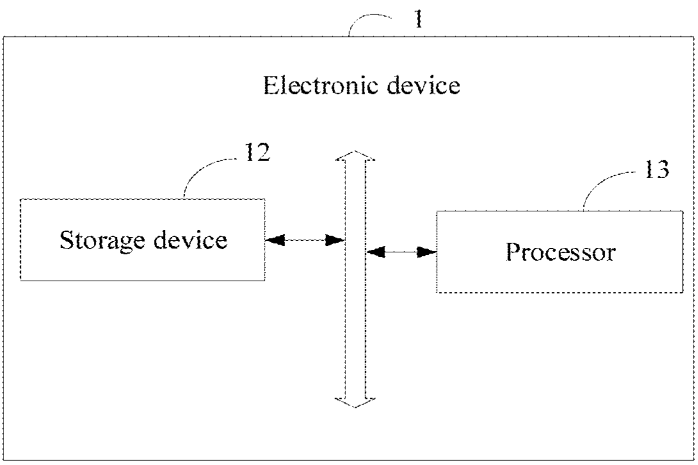
FIG. 1 is a structural diagram of an electronic device in an embodiment of the present disclosure.

FIG. 1 is a structural diagram of an electronic device in an embodiment of the present disclosure.

In some embodiments of the present disclosure, a method for handling malfunctions can be applied to one or more electronic devices 1, and the electronic device 1 is a device capable of executing computer-readable instructions to automatically perform numerical calculations and/or information processing, and its hardware includes but is not limited to a microprocessor, an Application Specific Integrated Circuit (ASIC), a Field□Programmable Gate Array (FPGA), a Digital Signal Processor (DSP), embedded devices and so on.

The electronic device 1 may be any kind of electronic product that allows human-computer interactions with a user, such as, for example, a personal computer, a tablet computer, a smartphone, a Personal Digital Assistant (PDA), a gaming console, an Internet Protocol Television (IPTV), smart wearable devices, and the like.

The electronic device 1 may include a network device and/or a user device. The network device includes but is not limited to a single network electronic device, a group of electronic devices including a plurality of network electronic devices, or a cloud server including a large number of hosts or network electronic devices based on cloud computing.

A network that the electronic device 1 is connected includes but is not limited to the Internet, a wide area network, a metropolitan area network, a local area network, a Virtual Private Network (VPN), and the like.

In some embodiments of the present disclosure, the electronic device 1 includes, but is not limited to a storage device 12, a processor 13, and computer-readable instructions, such as handling malfunctions programs, stored in the storage device 12 and can be invoked by the processor 13.

It will be understood by those skilled in the art that the schematic drawings are merely examples of the electronic device 1 and do not constitute a limitation of the electronic device 1, and may include more or fewer components than illustrated, or a combination of certain components, or different components, e.g., the electronic device 1 may also include an input/output device, a network access device, a bus, and the like.

The processor 13 may be a central processing unit (CPU), or may be other general-purpose processor, a digital signal processor (DSP), an Application Specific Integrated Circuit (ASIC), Field-Programmable Gate Array (FPGA) or other programmable logic devices, discrete gate or transistor logic devices, discrete hardware components, and so on. The general-purpose processor can be a microprocessor or processor can be any conventional processor, etc., the processor 13 is the computing core and control center of the electronic device 1, using a variety of interfaces and lines to connect various parts of the entire electronic device 1, and the execution of the operating system of the electronic device 1, as well as the installation of various types of application programs, program code, etc.

The storage device 12 may be an external memory and/or an internal memory of the electronic device 1. Further, the storage device 12 may be a memory having a physical form, such as a memory stick, a Trans-flash Card, and the like.

In relation with FIG. 2 to FIG. 5, the storage device 12 in the electronic device 1 stores computer-readable instructions, and the processor 13 may execute the computer-readable instructions stored in the storage device 12 thereby realizing a plurality of processes as shown in FIG. 2-FIG. 5 to implement the method for handling malfunctions.

Figure 2:
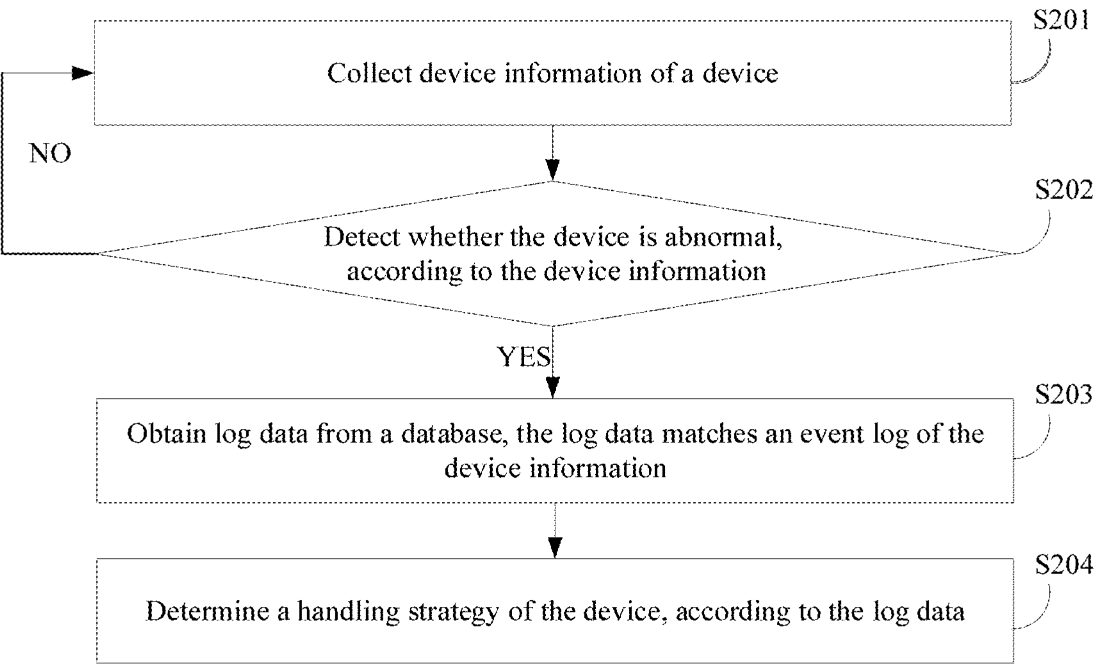
FIG. 2 is a flowchart of a method for handling malfunctions in an embodiment of the present disclosure.

FIG. 2 is a flowchart of a method for handling malfunctions in an embodiment of the present disclosure. The method for handling malfunctions is applied to an electronic device, such as the electronic device 1 in FIG. 1. The method for handling malfunctions in the embodiments of the present disclosure comprises steps S201-S204. According to different needs, an order of the following blocks in the flowchart can be changed, and some of them can be omitted.

In block S201, the electronic device collects device information of a device.

In one embodiment, the device may be any device in a large data center, a medium data center, or a small data center. The device can also be a monitoring device in a monitoring scene, etc. The device information may include, but is not limited to, configuration information, event logs, and working temperature. The configuration information includes configuration parameters related to hardware of the device and configuration parameters related to software of the device. For example, the configuration information may include a brand of the device, a model of the device, a type of processors in the device and a number of the processors in the device, a memory size of the device, a storage capacity of the device, and a screen resolution rate of the device. The event logs record operating status of a system or an application in the device. For example, the event logs record events, exceptions, warnings or error messages in the system or the application, and performance data of the system.

The device may be connected to sensors, and the sensors may also be installed in the device. The sensors may include, but are not limited to, a temperature sensor, an acceleration sensor, a barometric pressure sensor, a position sensor. The working temperature of the device may be obtained from the temperature sensor installed in the device, and the working temperature of the device may also be obtained from the temperature sensor connected to the device. The working temperature of the device may include but is not limited to a working temperature of a host computer in the device, a working temperature of an uninterruptible power supply (UPS) in the device, and a working temperature of a power distribution unit (PDU) in the device. The electronic device can monitor the working temperature of the device in real time by using the temperature sensor, and can quickly determine whether a temperature condition of the device is normal.

In one embodiment, the electronic device determines a tool according to a plurality of preset monitoring objects of the device. The preset monitoring objects may include systems and applications to be monitored, events to be monitored, etc., and the preset monitoring objects may be set according to user requirements. The tool may include, but is not limited to, an event viewer of the WINDOWS™ operating system, a syslog of the LINUX™ operating system, and a third-party log management tool (for example, Splunk, ELK Stack, Gray log). The electronic device can configure collection rules for the tool, in which the collection rules can include, but are not limited to, log sources, log levels, filter conditions, storage locations, and a format of logs. The electronic device collects event logs of the device according to the collection rules configured in the tool. The event logs may include, but is not limited to, an event log of the operating system and a baseboard management controller system event log (BMC SEL).

A suitable tool can be determined according to the preset monitoring objects, which can reduce a data loss, or an error due to the tool. By configuring the collection rules for the tool, a collection of unnecessary data can be reduced and an efficiency of a log collection can be improved.

In one embodiment, the electronic device determines a collection method according to a type of the device. For example, for a server, configuration information of the server can be collected through a command line tool (such as lscpu, free-h, ipconfig, etc.) or a configuration viewing tool (such as a window of WINDOWS™). For a network device, configuration information of the network device can be collected by logging into a command-line interface (CLI) of the network device or using a network management tool (such as SNMP). The electronic device collects the configuration information using the collection method. The electronic device saves the collected configuration information to a preset file. For example, the electronic device creates a first config. txt file and a second config. txt file. The first config. txt file and the second config. txt file can respectively store the configuration information at different times.

In one embodiment, the electronic device may provide a display interface, and the electronic device displays the device information of the device in a preset form on the display interface. The device information includes, but is not limited to, the working temperature, location information, and an operating state. The electronic device may obtain the location information from a location sensor, and determine the operating state based on performances of the device. For example, the operating state includes a normal working state, a high load state, and a fault state. The preset form may include, but is not limited to a list view, and a plan layout diagram. The electronic device may convert the device information into the preset form for display, so that the temperature condition, the location information, and the operating state of the device can be intuitively understood by a user.

In block S202, the electronic device detects whether the device is abnormal, according to the device information.

In one embodiment, in response that the device is abnormal, the electronic device executes block S203 to block S204. In response that the device is not abnormal, the electronic device executes block S201.

In one embodiment, the device information includes first configuration information of the device in a first time period and second configuration information of the device in a second time period, the first time period is chronologically before the second time period. In response that the second configuration information is different from the first configuration information, the electronic device determines that the device is abnormal. Each of the first configuration information and the second configuration information may include a number of central processing units (CPUs), a frequency of the CPU, a supplier of the CPU, a number of disks, a manufacturer of the disk, a disk size, a network connection speed. By comparing contents of the second configuration information and the first configuration information, the electronic device may identify a difference between the second configuration information and the first configuration information, thereby determining whether the second configuration information is lost, which helps to quickly determine whether the device is abnormal.

In one embodiment, the electronic device detects whether the event log includes any error log corresponding to the hardware in the device, based on a first preset condition. In response that the event log includes an error log corresponding to the hardware in the device, the electronic device determines that the device is abnormal. In response that the event log does not include an error log corresponding to the hardware in the device, the electronic device continues to collect the device information of the device.

The first preset condition varies depending on different hardware. For example, the first preset condition corresponding to the CPU can be: viewing an error log related to the CPU by using a "dmesg|grep-i cpu.*error" command. The first preset condition corresponding to the CPU also can be: entering a baseboard management controller (BMC) system by using an "ipmitool" command, viewing an event log of the device by using an "ipmitool sel list" command, and finding an error log from the event log by using a keyword "CPU" or a keyword "processor". The first preset condition corresponding to a memory can be: viewing an error log related to the memory by using a "dmesg|grep-i memory\|ram\|error\|fail" command. The first preset condition corresponding to the memory also can be: viewing the event log of the BMC system by using a "ipmitool sel elist" command, and finding an error log related the memory from the event log by using a keyword "Memory".

For example, the electronic device runs a "dmesg|grep-i cpu" command, and obtains a log of "[12.345678] CPU0: Temperature above threshold: 95 C" and a log of "[12.345679] CPU0: Throttling due to high temperature". The electronic device determines that the event logs include two error logs related to the CPU. For example, the electronic device runs an "ipmitool sel list" command and obtains the event log of the BMC system. In response that the event log of the BMC system includes information related to the CPU, the electronic device determines that the event log includes an error log related to the CPU.

In one embodiment, the electronic device determines a first preset range, according to a device type of the device. In response that the working temperature of the device is out of the first preset range, the electronic device determines that the device is abnormal.

The device type of the device may include, but is not limited to a type of a desktop computer type, a server type, and an embedded computer type. The first preset range may include a first threshold and a second threshold. The first threshold is smaller than the second threshold. The first preset range may be set and adjusted according to the device type. For example, the first preset range corresponding to the desktop computer type can be set to (35° C., 70° C.), and the first preset range corresponding to the server type can be set to (40° C., 80° C.).

In one embodiment, the electronic device may determine the first preset range based on a hardware type of the hardware in the device. The hardware type includes a CPU type, a graphics card type, a hard disk type, etc. For example, the first preset range of the working temperature corresponding to the CPU type can be set to (50° C., 75° C.), the first preset range of the working temperature corresponding to the graphics card type can be set to (30° C., 85° C.).

In one embodiment, in response that the working temperature of the device is less than or equal to the first threshold, the electronic device determines that the working temperature of the device is too low, and determines that the device is abnormal. In response that the working temperature of the device is greater than or equal to the second threshold, the electronic device determines that the working temperature of the device is too high, and determines that the device is abnormal. Following the above example, the first preset range corresponding to the server type is set to (40° C., 80° C.), where the first threshold is 40° C. and the second threshold is 80° C. In response that the working temperature of the server is 35° C., as the working temperature of 35° C. is less than the first threshold of 40° C., thus, the working temperature of the server is not within the first preset range (40° C., 80° C.), the electronic device determines that the server is abnormal. In response that the working temperature of the server is 85° C. and the working temperature 85° C. is greater than the second threshold 80° C., thus, the working temperature of the server is not within the first preset range (40° C., 80° C.), the electronic device determines that the server is abnormal. For another example, the first preset range corresponding to the CPU type is set to (50° C., 75° C.), where the first threshold is 50° C. and the second threshold is 75° C. In response that the working temperature of the CPU is 35° C., and the working temperature 35° C. is less than the first threshold 50° C., thus, the working temperature of the CPU is not within the first preset range (50° C., 75° C.), the electronic device determines that the CPU is abnormal. In response that the working temperature of the CPU is 80° C., and the working temperature 80° C. is greater than the second threshold 75° C., thus, the working temperature of the CPU is not within the first preset range (50° C., 75° C.), the electronic device determines that the CPU is abnormal.

The first preset range is set according to the device type or the hardware type, a rationality of the setting of the first preset range can be improved.

In block S203, in response that the device is abnormal, the electronic device obtains log data from a database, the log data matches an event log of the device information.

In one embodiment, the electronic device extracts keywords from the event log according to a plurality of preset rules. The electronic device determines a match degree of log between the event log and each preset log in the database according to the keywords. The electronic device determines a preset log in the database corresponding to the match degree of log that is greater than a preset threshold as the log data.

The plurality of preset rules may be set to as follows: rules for determining keywords. For example, in response to any words having a number of appearances in the event log more than or equal to a threshold value, the any words can be used as keywords. For example, the event log of the device can be represented as: "{2023-04-01 10:00:01 CPU temperature high, CPU fan speed low}". The electronic device extracts the keywords of the event log based on the plurality of preset rules. For example, the threshold value is set to be "2", it is indicated that the information is used as the keywords for more than two times in the event log. For another example, a number of "CPU" appeared in the event log is two times, a number of "temperature" appeared in the r event log is one time, and a number of "high" appeared in the event log is one time. Therefore, the keywords in the event log include "CPU".

Keywords related to specified events to be extracted from the event log according to the preset rules, so that important information can be quickly found and a time for processing irrelevant information can be reduced. By searching the preset logs in the database through the keywords, a log matching the event log can be found quickly among a large number of the preset logs, a searching efficiency can be improved.

In one embodiment, the electronic device traverses the preset logs in the database according to a structured query language or other database query language. The electronic device determines a match degree of log between the event log and each preset log in the database according to the keywords. The electronic device determines the preset log corresponding to a match degree of log that is greater than the preset threshold, and determines the preset log as the log data. The preset threshold can be set and adjusted according to actual requirements. For example, three logs are traversed through using the structured query language, three logs are represented as follows: {a first log: "insufficient disk space prevented application "X" from writing data. Error code: E001"; a second log: "network interface card has failed, network connection was interrupted. Error code: E002"; a three log: "memory leak caused slow system response. Error code: E003"}. in response that the event log is: "insufficient disk space, application Y failed when trying to write data. Error code: E001". The keywords extracted from the event log may include six keywords, for example, "insufficient disk space", "application", "write data", "failed", "Error code" and "E001". The first log includes "insufficient disk space", "Error code", "E001", "application", "writing data", and the first log has five keywords. The second log includes "Error code", and the second log has one keyword. The third log includes "Error code" and the third log has one keyword. The electronic device determines a match degree of log between the event log and the first log: $5/6$=83%. The electronic device determines a match degree of log between the event log and the second log: $1/6$=16%. The electronic device determines a match degree of log between the event log and the third log: $1/6$=16%. If the preset threshold is set to 70%, the electronic device determines the first log as the log data.

According to structured query language or other database query language, different matching rules of keywords can be adapted, and flexibility of querying can be improved. Accuracy and comprehensiveness can be improved by determining a match degree of log between the event log and each preset log in the database and then determining the log data based on the match degree of log.

In one embodiment, the electronic device extracts keywords of the event log according to a plurality of preset rules. The electronic device counts a number of keywords of the preset logs, and determines a preset log with a greatest number of keywords as the log data. Following the above example, the first log includes "insufficient disk space", "Error code", "E001", "application", "writing data", and the first log has five keywords. The second log includes "Error code", and the second log has one keyword. The third log includes "Error code" and the third log has one keyword. The electronic device determines the first log with the largest number of keywords as the log data.

In block S204, the electronic device determines a handling strategy of the device, according to the log data.

In one embodiment, the electronic device determines the handling strategy corresponding to the device from the database according to the log data.

By collecting the device information of the device, and detecting whether the device is abnormal, the device information includes various operating parameters and performance data of the device in real time, thus, device problems can be discovered in a timely manner by analyzing the device information. By obtaining the log data that matches the event log in the database, the log data in the database that is similar to the event log of the device can be identified, thereby quickly locating roots cause of the device problem and improving the efficiency of determining the handling strategy. Based on the log data, the handling strategy of the device is determined, and an effective handling strategy can be obtained, thereby ensuring stable operation and performance of the device and improving a user experience.

Figure 3:
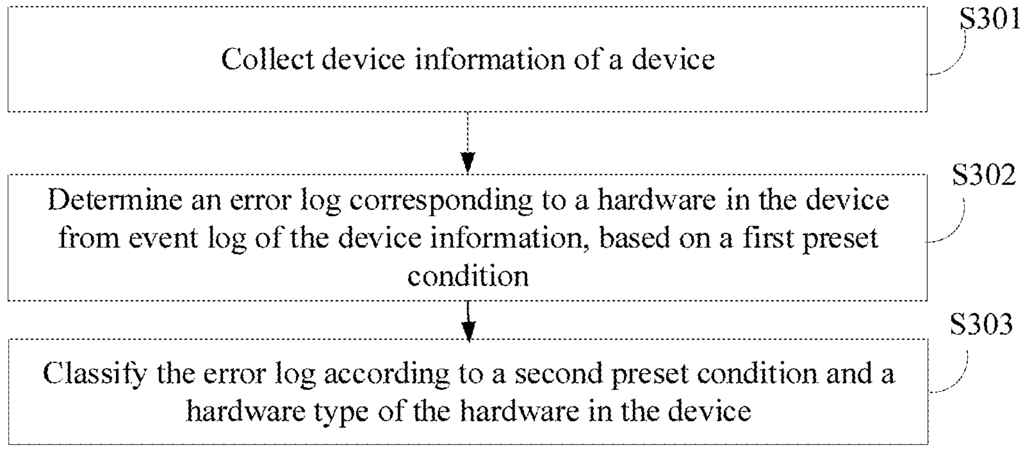
FIG. 3 is a flowchart of a method for handling malfunctions in another embodiment of the present disclosure.

FIG. 3 is a flowchart of a method for handling malfunctions in another embodiment of the present disclosure. The method for handling malfunctions is applied to an electronic device, such as the electronic device 1 in FIG. 1. As shown in FIG. 3, the method for handling malfunctions in the embodiments of the present disclosure includes blocks S301-S303. According to different needs, an order of the following blocks in the flowchart can be changed, and some of them can be omitted.

In block S301, the electronic device collects device information of a device.

In block S302, the electronic device determines an error log corresponding to the hardware in the device from the event log of the device information, based on a first preset condition.

Blocks S301-S302 can be referred to detailed descriptions of blocks S201-S202 in FIG. 2, and the descriptions are not repeated here.

In block S303, the electronic device classifies the error log according to a second preset condition and a hardware type of the hardware in the device.

In one embodiment, the electronic device determines a hardware type of the hardware in the device. The hardware type may include but is not limited to a CPU type, a memory type, and a disk type. The electronic device determines an error log corresponding to the hardware type according to the second preset condition, and classifies the error log into a corresponding to list related to the hardware type. The second preset condition can be set and adjusted according to actual requirements. The second preset condition can be set to a regular expression with keywords, the keywords include a keyword related to the hardware (such as "CPU", "memory", "disk", "network", "GPU") and a preset keyword (such as "error", "fail", "fault"). For example, the second preset condition can be set as: "\bCPU\b.*\b(error|fail|fault)\b", where "\b" is a boundary of the keyword, and "\b" can ensure that "CPU" is used as an independent keyword, "*\" presents there be any content between "CPU" and the preset keyword, "\b(error|fail|fault)\b" can be used to match any preset keyword of "error", "fail" or "fault".

By determining the error log corresponding to the hardware type through the second preset condition, the error log corresponding to the hardware type can be accurately obtained. By classifying the error log into the corresponding to the list, the error log is made more structured and facilitates subsequent analysis and processing.

In one embodiment, the electronic device sends alert information to a terminal device, based on the hardware type. The terminal device may be an electronic device designated by a preset person. The alert information may include, but is not limited to, the hardware type, causes of abnormality of the hardware in the device, location information of the hardware in the device. In response that the device is abnormal, the electronic device sends the alert information, thus, a user of the terminal device can realize the abnormality of the device in a timely manner, thereby ensuring stable operation of the device.

In one embodiment, the electronic device analyzes the event log, and determines location information of an error hardware. For example, the electronic device extracts error checking and correcting (ECC) log data from the BMC SEL, and compares the extracted ECC log data with preset information in a BMC component. The preset information in the BMC component includes an encoding method of an error ECC and an encoding conversion rule. The electronic device determines data information in the ECC log data that is different from the preset information, converts the data information based on the encoding conversion rule. The electronic device obtains conversion information, and determines the location information of a memory in which an error occurred based on the conversion information. By comparing the ECC log data with the preset information, it is possible to quickly recognize that an error has occurred in the memory. By converting the data information by the encoding conversion rule, it is possible to accurately locate a position of the memory in which the error occurred.

Figure 4:
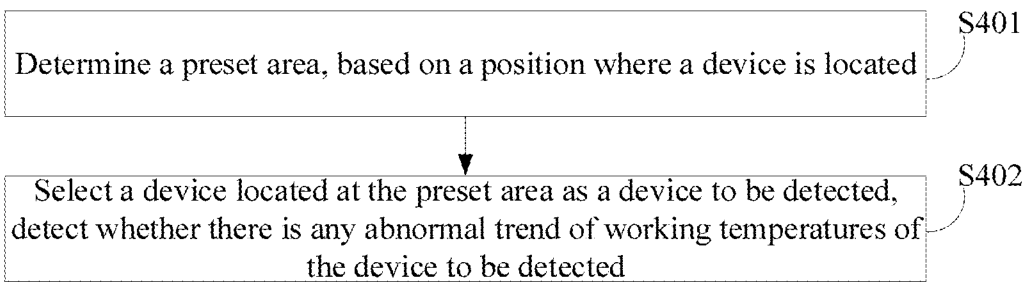
FIG. 4 is a flowchart of a method for handling malfunctions in yet another embodiment of the present disclosure.

FIG. 4 is a flowchart of a method for handling malfunctions in yet another embodiment of the present disclosure. The method for handling malfunctions is applied to an electronic device, such as the electronic device 1 in FIG. 1. As shown in FIG. 4, the method for handling malfunctions in the embodiments of the present disclosure includes blocks S401-S402. According to different needs, an order of the following blocks in the flowchart can be changed, and some of them can be omitted.

In block S401, the electronic device determines a preset area, based on a position where a device is located.

In one embodiment, the electronic device determines location information of the device as a center, and the electronic device determines the preset area according to the center and a distance threshold. The distance threshold may be set and adjusted according to actual requirements. A shape of the preset area may be a circle, a rectangle, a polygon, and the like. For example, the preset area may be a circle with the position information of the device as the center and the distance threshold as a radius. The preset area may be a rectangular region, of which the center is the device and a side length is the distance threshold.

By setting the distance threshold according to actual requirements, different shapes of the preset area can be determined, requirements of different scenarios can be met, and reasonableness of the determination of the preset area can be improved.

In one embodiment, the electronic device determines parses event log of device information by using a log analysis tool. The log analysis tool includes a log parser, a manager of log and event, etc. The electronic device determines location information related to the position where the device is located from a parsed log data, according to a preset field. The location information may include an Internet Protocol (IP) address of the device, a Media Access Control (MAC) address, a physical location identifier (such as a room number, a floor, a building, etc.). A physical location of the device can be determined from the location information of the device.

For example, the electronic device determines the location information as following: "a fourth log: 2023-10-01 12:34:56, INFO, DeviceConnected, IP=192.168.1.10, MAC=00-1A-2B-3C-4D-5E, Room=201, Floor=2, Building=A", "a fifth log: 2023-10-01 12:36:30, INFO, DeviceDisconnected, IP=192.168.1.10, MAC=00-1A-2B-3C-4D-5E", "a sixth log: 2023-10-01 12:37:45, INFO, DeviceConnected, IP=192.168.1.30, MAC=00-11-22-33-44-55, Room=305, Floor=3, Building=B". The electronic device determines a device with IP address "192.168.1.10" (a device with MAC address "00-1A-2B-3C-4D-5E") is in room "201" on the "2$^{nd}$" floor of building "A", according to the fourth log. Although the fifth log does not directly record a physical location of a device, since an IP address and a MAC address of the fifth log is match an IP address and a MAC address of the fourth log, the electronic device determines a device corresponding to the fifth log is "201" on the "2$^{nd}$" floor of building "A", from the fourth log. The electronic device determines a device with IP address "192.168.1.30" (a device with MAC address "00-11-22-33-44-55") is in room "305", on the "3$^{rd}$" floor of building "B", according to the sixth log.

By analyzing the event log and extracting the location information of errors recorded in the event log, a source of the fault can be quickly located, and an efficiency of troubleshooting can be improved.

In block S402, the electronic device selects a device located within the preset area as a device to be detected, and detects whether there is any abnormal trend in working temperatures of the device to be detected.

In one embodiment, the electronic device determines whether a device located within the preset area based on a device position of a preset device. The preset device located within the preset area is determined to be the device to be detected.

In one embodiment, the electronic device collects working temperatures of the device to be detected in a third time period, and collects working temperatures of the device to be detected in a fourth time period. The third time period is chronologically before the fourth time period. The electronic device obtains time series data, based on the working temperatures of the third time period and the working temperatures of the fourth time period. The electronic device divides the time series data into a plurality of time windows. The plurality of time windows may have a same length of time. The electronic device measures a time distance of every two time windows, determines a shortest time distance from the time distances measured and determines one or more time window groups from the plurality of time windows corresponding to the shortest time distance. The electronic device calculates a mean difference of each of the one or more time window groups, according to an average temperature of each time window of each of the one or more time window groups. The electronic device determines a detection result, according to the mean difference. The detection result may include a first result and a second result, the first result can indicate that there is the abnormal trend of the working temperatures of the device to be detected, and the second result can indicate that there is no abnormal trend of the working temperatures of the device to be detected.

By constructing the working temperatures of the device to be detected as ordered time series data, the efficiency of data analysis can be improved. By dividing the time series data into the time windows having the same length and calculating the average temperature for each time window, an impact on the overall temperature trend determination due to instantaneous temperature fluctuations can be reduced because a calculation is not performed on the time series data, thereby improving an accuracy and reliability of the detection result.

In one embodiment, the electronic device determines a start time of each time window, and calculates a time distance of every two time windows based on the start time of each time window. The electronic device determines the shortest time distance and determines the time window groups corresponding to the shortest time distance. The time distance may also be determined based on the end time of each time window.

By determining a start time or an end time of each time window, a range of every two time windows can be defined clearly, thereby ensuring an accuracy and a consistency of the time distance and improving the accuracy of the time window group.

In one embodiment, the electronic device determines the detection result is the first result, in response that no mean differences is within a second preset range. The second preset range may be set and adjusted according to actual requirements.

In one embodiment, in response that all mean differences are within the second preset range, the electronic device determines the detection result is the second result.

The detection result is determined by comparing the mean difference of the time window groups with the second preset range, and a detection efficiency can be improved as there is no need to analyze the mean difference of the time series data.

By determining a preset area based on the position information of the device and the distance threshold, a selection range can be reduced and the efficiency of determining the device to be detected can be improved. By detecting whether there is any abnormal trend of working temperatures of the device to be detected, a handling strategy can be implemented before abnormalities occur in the device to be detected, troubleshooting can be performed in a timely manner, and a user experience can be improved.

Figure 5:
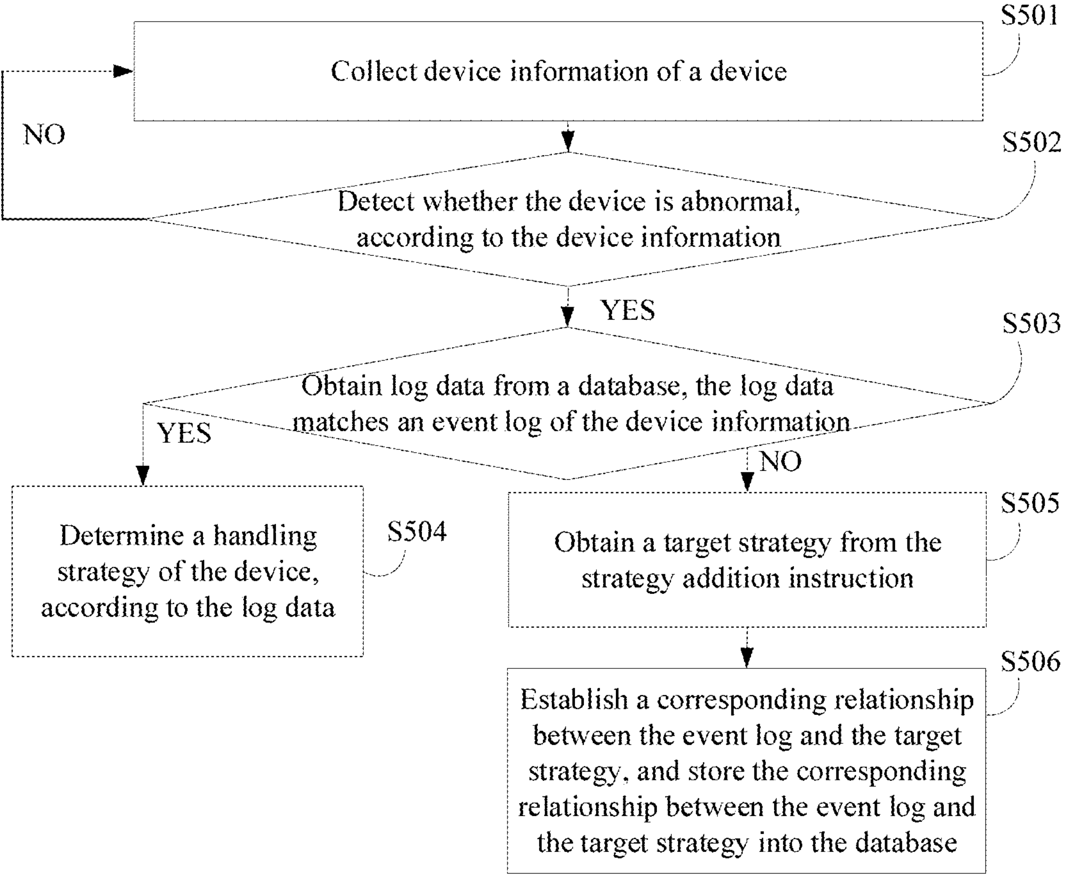
FIG. 5 is a flowchart of a method for handling malfunctions in yet another embodiment of the present disclosure.

FIG. 5 is a flowchart of a method for handling malfunctions in yet another embodiment of the present disclosure. The method for handling malfunctions is applied to an electronic device, such as the electronic device 1 in FIG. 1. As shown in FIG. 5, the method for handling malfunctions in the embodiments of the present disclosure includes blocks S501-S506. According to different needs, an order of the following blocks in the flowchart can be changed, and some of them can be omitted.

In block S501, the electronic device collects device information of a device.

In block S502, the electronic device detects whether the device is abnormal according to the device information.

In block S503, in response that the device is abnormal, the electronic device obtains log data from a database, the log data matches an event log of the device information.

Blocks S501-S503 can be referred to detailed descriptions of blocks S201-S203 in FIG. 2, and the descriptions are not repeated here.

In one embodiment, in response that the database includes the log data, the electronic device performs block S504. In response that the database does not include the log data, the electronic device performs block S505-S506.

In block S504, the electronic device determines a handling strategy of the device according to the log data.

Blocks S504 can be referred to detailed descriptions of blocks S204 in FIG. 2, and the descriptions are not repeated here.

In block S505, in response to a strategy addition instruction sent from a terminal, the electronic device obtains a target strategy from the strategy addition instruction.

In one embodiment, the electronic device parses the strategy addition instruction sent by the terminal into a preset data structure, and extracts key information from the parsed data structure as a target strategy. The target strategy may include a strategy identifier, a strategy description, strategy rules, etc. The preset data structure is usually defined according to an actual requirement of the device.

By parsing the strategy addition instruction into the preset data structure, it can ensure that a received target strategy meets an expected format and content, information format errors or missing content can be avoided, thereby improving an accuracy of the target strategy.

In one embodiment, the electronic device verifies key information of the target strategy. For example, the electronic device verifies that the strategy identifier is unique and verifies that the strategy rules are valid expressions or scripts. The electronic device deletes redundant information in the target strategy, where the redundant information includes redundant spaces, unnecessary characters, etc.

By verifying the target strategy and deleting the redundant information of the target strategy, an accuracy and effectiveness of the target policy can be ensured.

In block S506, the electronic device establishes a corresponding relationship between the event log and the target strategy, and stores the corresponding relationship between the event log and the target strategy into the database.

In one embodiment, the electronic device stores the corresponding relationship between the event log and the target strategy into the database, by using a structured query language (such as an insert statement) or other insertion language.

Figure 6:
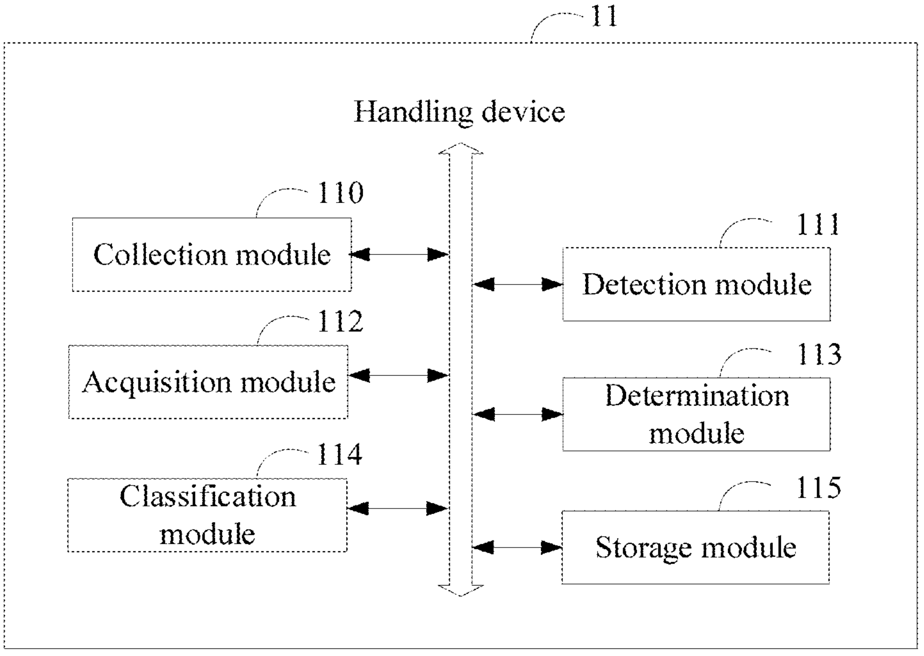
FIG. 6 is a structural diagram of a handling device in an embodiment of the present disclosure.

FIG. 6 is a structural diagram of a handling device in an embodiment of the present disclosure. In some embodiments, the handling device 11 may be an electronic device. In some embodiments, the handling device 11 may include a collection module 110, a detection module 111, an acquisition module 112, a determination module 113, a classification module 114, and a storage module 115. The modules in this disclosure refers to a series of computer-readable instruction segments capable of being acquired by a processor (e.g., the processor 13 shown in FIG. 1) and capable of accomplishing a fixed function, which are stored in a storage device (e.g., the storage device 12 shown in FIG. 1).

The collection module 110 collects device information of a device. The detection module 111 detects whether the device is abnormal, according to the device information. In response that the device is abnormal. The acquisition module 112 obtains log data from a database, the log data matches an event log of the device information. The determination module 113 determines a handling strategy of the device, according to the log data.

The device information includes first configuration information of the device in a first time period and second configuration information of the device in a second time period. In response that the second configuration information is different from the first configuration information, the detection module 111 determines that the device is abnormal.

The detection module 111 detects whether the event log includes any error log corresponding to a hardware in the device, based on a first preset condition. In response that the event log comprises an error log corresponding to a hardware in the device, the detection module 111 determines that the device is abnormal.

The classification module 114 classifies the error log according to a second preset condition and a hardware type of the hardware in the device.

The device information includes working temperature of the device. The detection module 111 determines a first preset range, according to a device type of the device. In response that the working temperature of the device is out of the first preset range, the detection module 111 determines that the device is abnormal.

The determination module 113 determines a preset area, based on a position where the device is located. The detection module 111 selects a device located at the preset area as a device to be detected, and detects whether there is any abnormal trend of working temperatures of the device to be detected.

The acquisition module 112 extracts keywords of the event log according to a plurality of preset rules. The acquisition module 112 determines a match degree of log between the event log and each preset log in the database according to the keywords. The acquisition module 112 determines determining a preset log corresponding to a match degree of log that is greater than a preset threshold, and determines the preset log as the log data In response to a strategy addition instruction sent from a terminal, the acquisition module 112 obtaining a target strategy from the strategy addition instruction. The storage module 115 stores a relation between the event log and the target strategy into the database.

By collecting the device information of the device, and detecting whether the device is abnormal, the device information includes various operating parameters and performance data of the device in real time, thus, device problems can be discovered in a timely manner by analyzing the device information. By obtaining the log data that matches the event log in the database, the log data in the database that is similar to the event log of the device can be identified, thereby quickly locating roots cause of the device problem and improving the efficiency of determining the handling strategy. Based on the log data, the handling strategy of the device is determined, and an effective handling strategy can be obtained, thereby ensuring stable operation and performance of the device and improving a user experience.

The modules/units integrated in the electronic device 1 may be stored in a computer-readable storage medium if implemented as software functional units and sold or used as stand-alone products. Based on this understanding, all or part of the processes in the method of above-described embodiments may also be realized by the present disclosure through computer-readable instructions to instruct the relevant hardware to complete, and the computer-readable instructions may be stored in a computer-readable storage medium, which computer-readable instructions, when executed by a processor, may realize the blocks of above-described method embodiments.

The computer-readable instructions include computer-readable instruction code, the computer-readable instruction code may be in the form of a source code, in the form of an object code, in the form of an executable file, or in some intermediate form, and the like. The computer-readable medium may include any entity or device capable of carrying the computer-readable instruction code, a recording medium, a USB flash drive, a removable hard disk, a diskette, a CD-ROM, a computer memory, a Read-Only Memory (ROM).

Specifically, the specific implementation method of the processor 13 for the above-described computer-readable instructions can be referred to the description of the relevant blocks in the corresponding embodiments of FIG. 2-FIG. 5, and will not be repeated herein.

In the several embodiments provided in the preset disclosure, the disclosed device and method can be implemented in other ways. For example, the embodiments of the devices described above are merely illustrative. For example, a division of the modules is based on logical function only, and there can be other manners of division in actual implementation.

The modules illustrated as separated components may or may not be physically separated, and the components displayed as modules may or may not be physical units, for example, the modules may be located in one place, or the modules may be distributed to a plurality of network units. Some or all of these modules may be selected to fulfill the purpose of the embodiment scheme according to actual needs.

In addition, each functional module in each embodiment of the present disclosure can be integrated into one processing module, or can be physically present separately in each unit, or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Furthermore, it is clear that the word "comprising" does not exclude other units or steps and that the singular does not exclude the plural. A plurality of units or devices may also be realized by one unit or device through software or hardware. Words such as first, second, etc. are used to indicate names and do not indicate any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method to handle malfunctions, the method comprising:

collecting device information of a device using sensors;

detecting whether the device is abnormal, according to the device information;

in response that the device is abnormal, obtaining log data from a database, the log data matching an event log of the device information;

determining a handling strategy of the device, according to the log data;

determining a preset area, based on a position where the device is located as a center; and selecting a device located at the preset area as a device to be detected, detecting whether there is any abnormal trend of working temperatures of the device to be detected, comprising: collecting working temperatures of the device to be detected in a third time period, and collecting working temperatures of the device to be detected in a fourth time period, the third time period being chronologically before the fourth time period; obtaining time series data, based on the working temperatures of the third time period and the working temperatures of the fourth time period; dividing the time series data into a plurality of time windows, the plurality of time windows having a same length of time; measuring a time distance of every two time windows; determining a shortest time distance from time distances measured, and determining one or more time window groups from the plurality of time windows corresponding to the shortest time distance; calculating a mean difference of each of the one or more time window groups, according to an average temperature of each time window of each of the one or more time window groups; determining a detection result, according to the mean difference, the detection result comprising a first result and a second result, the first result being indicate that there is the abnormal trend of the working temperatures of the device to be detected, and the second result being indicate that there is no abnormal trend of the working temperatures of the device to be detected.

2. The method of claim 1, wherein the device information comprises first configuration information of the device in a first time period and second configuration information of the device in a second time period, and detecting whether the device is abnormal comprises:

in response that the second configuration information is different from the first configuration information, determining that the device is abnormal.

3. The method of claim 1, wherein detecting whether the device is abnormal comprises:

detecting whether the event log comprises any error log corresponding to a hardware in the device, based on a first preset condition;

in response that the event log comprises an error log corresponding to a hardware in the device, determining that the device is abnormal.

4. The method of claim 3, further comprising:

classifying the error log according to a second preset condition and a hardware type of the hardware in the device.

5. The method of claim 1, wherein the device information comprises working temperature of the device, detecting whether the device is abnormal comprises:

determining a first preset range, according to a device type of the device;

in response that the working temperature of the device is out of the first preset range, determining that the device is abnormal.

6. The method of claim 1, wherein obtaining the log data from the database comprises:

extracting keywords of the event log according to a plurality of preset rules;

determining a match degree of log between the event log and each preset log in the database according to the keywords;

determining a preset log corresponding to a match degree of log that is greater than a preset threshold, and determining the preset log as the log data.

7. The method of claim 1, further comprising:

in response to a strategy addition instruction sent from a terminal, obtaining a target strategy from the strategy addition instruction;

storing a relation between the event log and the target strategy into the database.

8. An electronic device comprising:

a processor; and a storage device storing a plurality of instructions, which when executed by the processor, cause the processor to:

collect device information of a device using sensors;

detect whether the device is abnormal, according to the device information;

in response that the device is abnormal, obtain log data from a database, the log data matching an event log of the device information;

determine a handling strategy of the device, according to the log data;

determine a preset area, based on a position where the device is located as a center; and select a device located at the preset area as a device to be detected, detect whether there is any abnormal trend of working temperatures of the device to be detected, comprising: collect working temperatures of the device to be detected in a third time period, and collect working temperatures of the device to be detected in a fourth time period, the third time period being chronologically before the fourth time period; obtain time series data, based on the working temperatures of the third time period and the working temperatures of the fourth time period; divide the time series data into a plurality of time windows, the plurality of time windows having a same length of time; measure a time distance of every two time windows; determine a shortest time distance from time distances measured, and determine one or more time window groups from the plurality of time windows corresponding to the shortest time distance; calculate a mean difference of each of the one or more time window groups, according to an average temperature of each time window of each of the one or more time window groups; determine a detection result, according to the mean difference, the detection result comprising a first result and a second result, the first result being indicate that there is the abnormal trend of the working temperatures of the device to be detected, and the second result being indicate that there is no abnormal trend of the working temperatures of the device to be detected.

9. The electronic device of claim 8, wherein the device information comprises first configuration information of the device in a first time period and second configuration information of the device in a second time period, the processor is further caused to:

in response that the second configuration information is different from the first configuration information, determine that the device is abnormal.

10. The electronic device of claim 8, wherein the processor is further caused to:

detect whether the event log comprises any error log corresponding to a hardware in the device, based on a first preset condition;

in response that the event log comprises an error log corresponding to a hardware in the device, determine that the device is abnormal.

11. The electronic device of claim 8, wherein the device information comprises working temperature of the device, the processor is further caused to:

determine a first preset range, according to a device type of the device;

in response that the working temperature of the device is out of the first preset range, determine that the device is abnormal.

12. The electronic device of claim 8, wherein the processor is further caused to:

extract keywords of the event log according to a plurality of preset rules;

determine a match degree of log between the event log and each preset log in the database according to the keywords;

determine a preset log corresponding to a match degree of log that is greater than a preset threshold, and determine the preset log as the log data.

13. A non-transitory computer-readable storage medium having stored thereon at least one computer-readable instructions, which when executed by a processor of an electronic device, causes the processor to perform a method for handling malfunctions, wherein the method comprises:

collecting device information of a device using sensors;

detecting whether the device is abnormal, according to the device information;

in response that the device is abnormal, obtaining log data from a database, the log data matching an event log of the device information;

determining a handling strategy of the device, according to the log data;

determining a preset area, based on a position where the device is located as a center; and selecting a device located at the preset area as a device to be detected, detecting whether there is any abnormal trend of working temperatures of the device to be detected, comprising: collecting working temperatures of the device to be detected in a third time period, and collecting working temperatures of the device to be detected in a fourth time period, the third time period being chronologically before the fourth time period; obtaining time series data, based on the working temperatures of the third time period and the working temperatures of the fourth time period; dividing the time series data into a plurality of time windows, the plurality of time windows having a same length of time; measuring a time distance of every two time windows; determining a shortest time distance from time distances measured, and determining one or more time window groups from the plurality of time windows corresponding to the shortest time distance; calculating a mean difference of each of the one or more time window groups, according to an average temperature of each time window of each of the one or more time window groups; determining a detection result, according to the mean difference, the detection result comprising a first result and a second result, the first result being indicate that there is the abnormal trend of the working temperatures of the device to be detected, and the second result being indicate that there is no abnormal trend of the working temperatures of the device to be detected.

14. The non-transitory computer-readable storage medium of claim 13, wherein the device information comprises first configuration information of the device in a first time period and second configuration information of the device in a second time period, and detecting whether the device is abnormal comprises:

in response that the second configuration information is different from the first configuration information, determining that the device is abnormal.

15. The non-transitory computer-readable storage medium of claim 13, wherein detecting whether the device is abnormal comprises:

detecting whether the event log comprises any error log corresponding to a hardware in the device, based on a first preset condition;

in response that the event log comprises an error log corresponding to a hardware in the device, determining that the device is abnormal.

16. The non-transitory computer-readable storage medium of claim 13, wherein the device information comprises working temperature of the device, detecting whether the device is abnormal comprises:

determining a first preset range, according to a device type of the device;

in response that the working temperature of the device is out of the first preset range, determining that the device is abnormal.

17. The non-transitory computer-readable storage medium of claim 13, wherein obtaining the log data from the database comprises:

extracting keywords of the event log according to a plurality of preset rules;

determining a match degree of log between the event log and each preset log in the database according to the keywords;

determining a preset log corresponding to a match degree of log that is greater than a preset threshold, and determining the preset log as the log data.

* * * * *